[19] United States Patent
Nielbock

[11] 4,427,323
[45] Jan. 24, 1984

[54] DEVICE FOR MAKING TWO AXIALLY PARALLEL BORES

[75] Inventor: Hans Nielbock, Bottrop, Fed. Rep. of Germany

[73] Assignee: M.A.N. Maschinenfabrik Augsburg-Nürnberg Aktiengesellschaft, Fed. Rep. of Germany

[21] Appl. No.: 285,055

[22] Filed: Jul. 20, 1981

[30] Foreign Application Priority Data

Sep. 17, 1980 [DE] Fed. Rep. of Germany ....... 3035011

[51] Int. Cl.³ .................... B23B 35/00; B23B 39/16; B23G 1/20
[52] U.S. Cl. ..................................... 408/42; 408/46; 408/1 R
[58] Field of Search .................... 29/558; 144/69, 72, 144/73, 78; 408/1 R, 42, 52, 53, 54, 188; 409/132

[56] References Cited

U.S. PATENT DOCUMENTS 2,808,745 10/1957 Swanson et al. ...................... 408/42
2,820,519 1/1958 Kneeland ............................. 408/42
2,821,218 1/1958 Hultquist ............................. 144/69
3,289,501 12/1966 Dubrovin ............................ 409/132
3,491,812 1/1970 Butler .................................. 144/78
4,053,249 10/1977 Ness et al. ............................ 408/1
4,147,461 4/1979 Schulstrasse ........................ 408/46

Primary Examiner—James M. Meister
Assistant Examiner—Paul M. Heyrana, Sr.
Attorney, Agent, or Firm—McGlew and Tuttle

[57] ABSTRACT

A device is disclosed for cutting two parallel partially intersecting bores, such as the bores used in a screw type compressor housing, comprising, a device housing, a pair of spindles rotatably mounted to the housing and a tool holder connected near the end of each spindle. The spindles are engaged with each other through gears so that rotation of one spindle in one direction causes rotation of the other spindle in opposite direction. A drive shaft is connected to one of the spindles for rotating the pair of spindles simultaneously. Each tool holder is elongated along a major tool holder axis thereof which is substantially transverse to an axis of its associated spindle. The major axes of the two tool holders are always substantially perpendicular to each other so that free rotation of the two spindles, in opposite directions is possible. The size of each tool holder and each spindle adjacent each tool holder is chosen so that there is always a minimum clearance between each tool holder and the spindle carrying the other tool holder.

4 Claims, 2 Drawing Figures

DEVICE FOR MAKING TWO AXIALLY PARALLEL BORES

FIELD AND BACKGROUND OF THE INVENTION

The present invention relates in general to bore cutting or forming machines and, in particular, to a new and useful device for substantially simultaneously cutting a pair of axially parallel bores which overlap each other so that they share a common cross-sectional area. Such overlapping bores are found for example, in screw-type compressor housings.

While devices are known for cutting two bores, such devices are not suited for making bore holes which intersect each other and thus share a common cross-sectional area. Such intersecting bores must be machined with extreme precision since, in screw-type compressors particularly, the rotary piston which are provided with threads engage each other with a minimum play or in a contact free manner.

It is usual in the prior art to machine the two bores in the housing one after the other by means of a single spindle boring machine. If the diameters of the two intersecting bores are not identical, it is known to machine the two bores with tool holders having different sizes. These tool holders are termed boring heads.

A problem of this prior art method is that the edges formed by the intersection of the two bores cause the bore axis of the boring machine to run off center. To date therefore, only specially trained and highly dependable workmen could be entrusted with this difficult task which in any case is very time consuming.

SUMMARY OF THE INVENTION

The present invention is directed to a device which permits the substantially simultaneous formation of two bores which extend in parallel to each other and partially intersect each other which bores may have equal or unequal diameters. The device forms these bores with the level of precision required for example in screw-type compressor housings. The device assures a more exact guidance and thus is a faster and more accurate machining of the workpiece which is to carry the bores. Preferably the inventive device is simple in construction and makes it possible, in operation, to securely perform the task required in an easy manner and accurately without requiring a high level of skill or qualification of the operator.

An object of the invention is to provide such a device which comprises a device housing, a pair of spindles rotatably mounted to the housing, a drive shaft or other drive means connected to one of the spindles and a tool holder connected adjacent the end of each of the spindles. The spindles are engaged to each other, for example by gears, so that the rotation of one spindle in one direction causes rotation of the other spindle in an opposite direction. The tool holders are specially shaped and each consists substantially of radially extending arms. The tool holders are thus elongated along a major tool holder axis which extends substantially transversely to the major axis of each associated spindle. The spindles are engaged to each other so that each major axis of each radial arm is substantially perpendicular to the other major axis of the other radial arm. Thus, as the spindles rotate in opposite directions, each major tool holder axis passes through each spindle axis, with the major axes being maintained perpendicular to each other. The radial length of each tool holder arm, that is the radial sides of each tool holder along its major axis, and the diameter of the spindle holding the other tool holder, are chosen so that a minimum clearance is always maintained between each radial arm of one tool holder and the spindle carrying the other tool holder. This clearance is at its minimum when the major axis of one tool holder passes through the axis of the spindle carrying the other tool holder.

The inventive design has the advantage that two intersecting bores extending in parallel to each other, can be made simultaneously while preventing the tool holders or the tools carried thereon, from interfering with each other. This is obtained by a combined effect of the synchronous but opposite rotation of the two spindles, and of the inventive design, and the angular position of the tool holders. The design makes it possible to join the two spindles to a single boring unit and results in the substantial advantage that the required tolerances of the bores can exactly be observed and the injuries effect of the edges of intersection of the two bores is neutralized.

A development of the invention provides that each tool holder comprises two arms which, considered in a sectional plane perpendicular to the spindle axis, extends symmetrically to produce a rhomboidal to flat elliptical configuration, the ends of which may be blunted. That is the tool holders may be rhomboidal or polygonal at one extreme of design, or eliptical at the other extreme of design.

This design confers a maximum strength to the tool holders and makes them inherently rigid, which contributes to the secure and exact guidance of the tools without hindering their working range.

In a further development of the invention, one of the spindles has a smaller diameter in the zone of the tool holder to provide the minimum clearance mentioned above.

This design is advantageous in permitting the making of one of the spindles particularly rigid and thus stable in a portion thereof which is subject to relatively high lateral moments, between the bearings and the tool holder, while providing a smaller spindle diameter, necessary for the function, only in the zone adjacent the holder, where relatively smaller lateral moments occur.

The invention further provides that each tool holder is equipped with cutters for simultaneously machining a side wall and a bottom of the bore hole in the workpiece.

This results in the advantageous possibility of making the bores in a single operation, and since the precision is increased, the workpiece can be machined faster, at the same time.

A further advantageous feature of the inventive device is that one of the spindles is driven and drives the other spindle by means of a pair of gears which are associated therewith. This results in the advantage of a compact and simple construction.

Finally, according to another advantageous development of the inventive device, the tool holders are provided on their front sides with guide elements for guide holes cut into the workpiece. This advantageously ensures a maximum precision in operation of the device and at the same time increases the operational efficiency thereof.

Another object of the invention is thus to provide a device for cutting a pair of intersecting bore holes, substantially simultaneously, which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
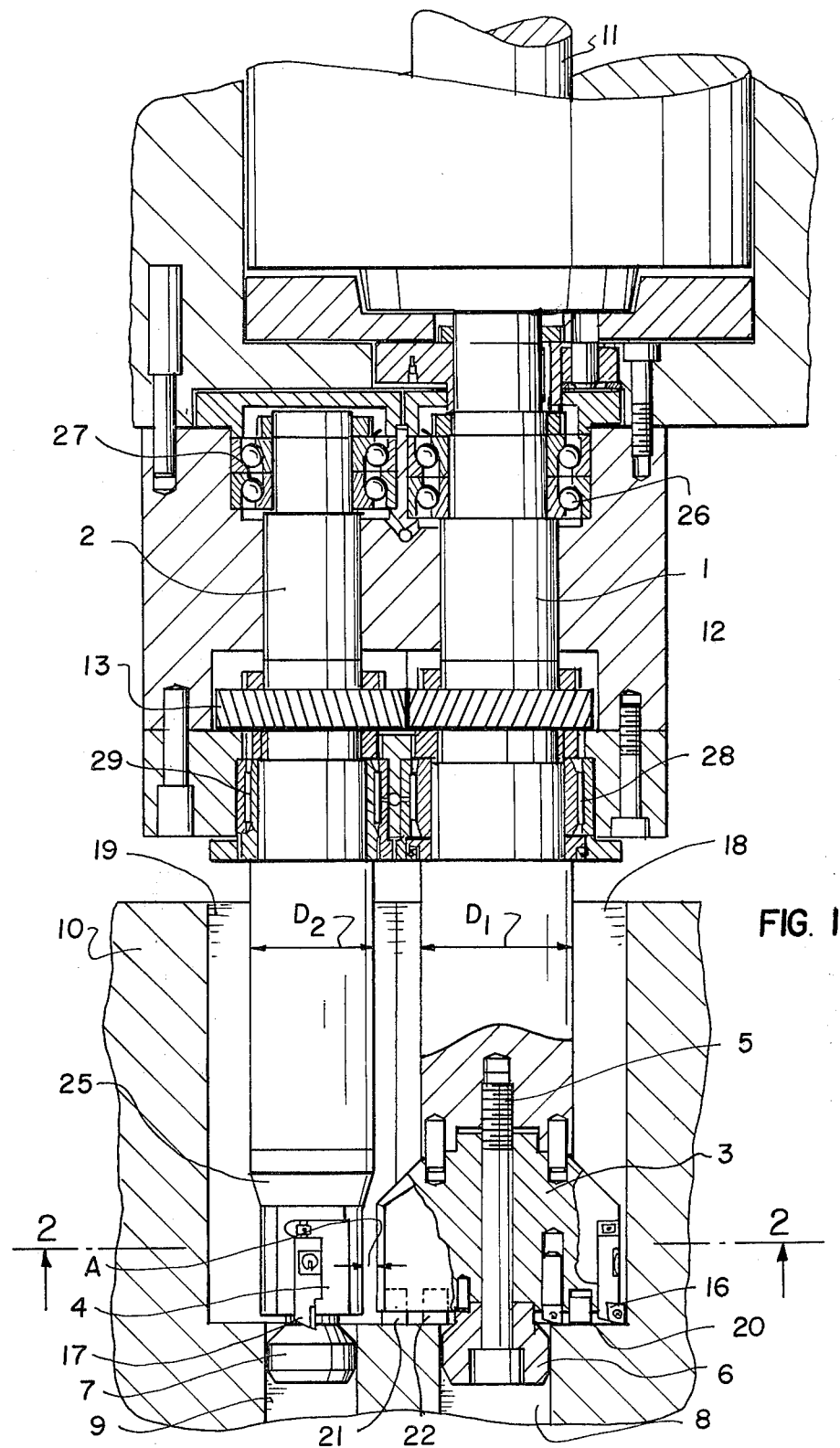
FIG. 1 is a side sectional view with portions shown in elevation, of the inventive device taken in a plane passing through the axis of rotation of the two spindles.

Turning to the drawings in particular, the invention embodied therein, in FIG. 1 comprises a boring device having boring spindles 1 and 2 to which tool holders 3 and 4 are secured on a work side thereof by means of bolts 5. Bolts 5 at the same time are used for securing guide elements 6 and 7 by which tool holders 3 and 4 are centered in guide holes 8 and 9 which are provided in a workpiece 10. Spindle 1 is clamped in a main spindle or drive shaft 11 of a boring machine (not shown) by which it is driven. Spindle 2 is driven in the opposite direction relative to spindle 1, by means of a gear 12 which is secured to spindle 1 and meshes with a gear 13 provided on spindle 2. The two gears 12,13 have identical numbers of teeth, diameters, and modules, so that the transmission ratio is one to one. Tool holders 3,4 are non-rotatably secured to spindles 1, 2 in such angular positions that, as clearly follows from FIGS. 1 and 2, there major axes XX', YY" are perpendicular to each other if either axis XX' passes through the axis of rotation R1, or axis YY' passes through the axis of rotation R2, the respective directions of rotation of spindles 1, 2 being indicated by arrows 14,15. Tool holders 3,4 carry cutters 16,17 for machining the side walls of parallel overlapping bores 18 and 19, and cutters 20 to 24 for machining the bottoms of the bores. The tool holders 3,4 are tapered at 25 to form central smaller diameter portions. The spindles, in their portions between the heavy duty bearings 26 to 29 and tool holder 3,4, have relatively large diameters and are very massive. The diameter reduction at 25 is necessary to obtain a clearance A between one tool holder 3 or 4 and the arm of the other tool holder 4 or 3 in the position of tool holders, 3, 4 shown in FIG. 1, for preventing a mutual interference.

Figure 2:
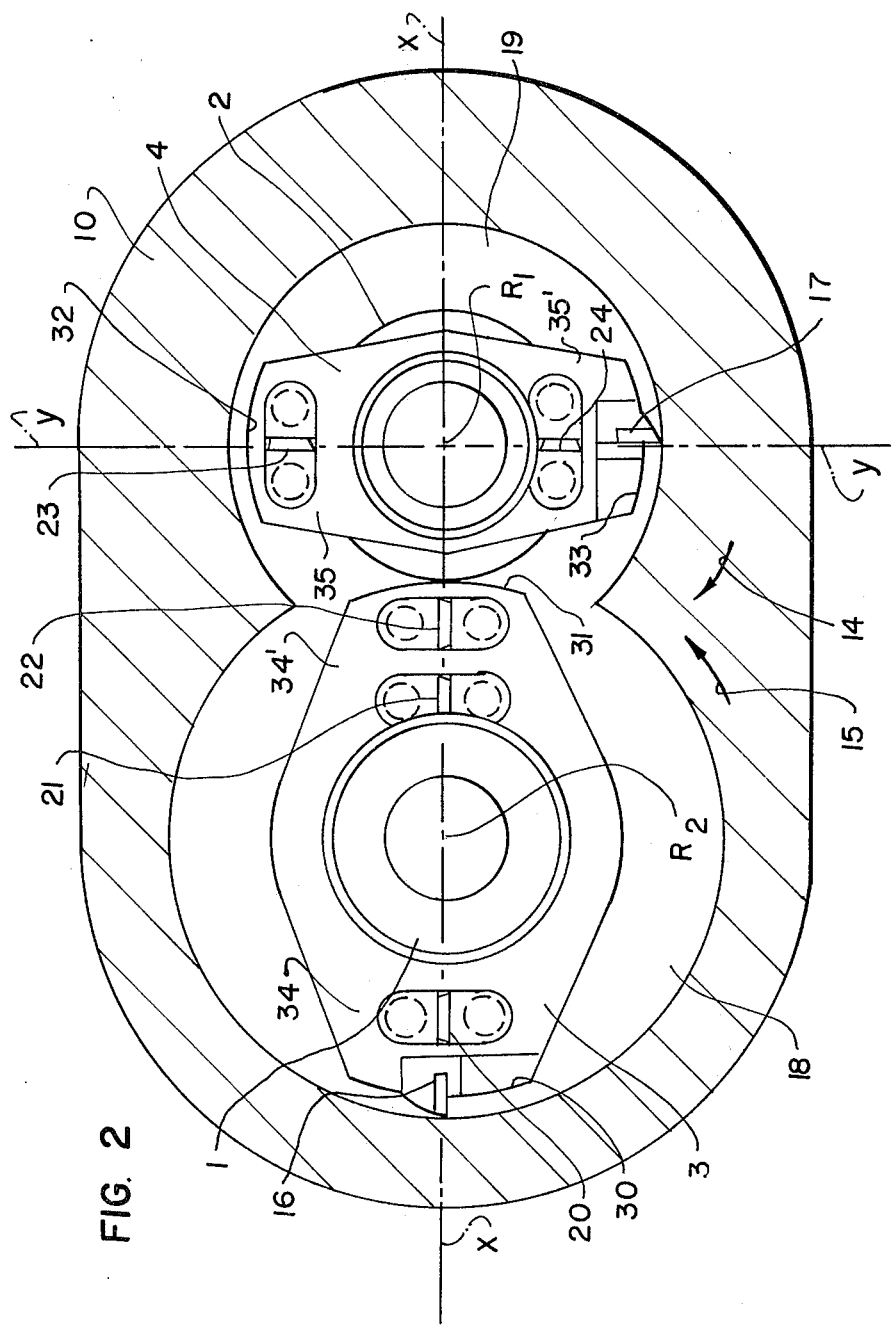
FIG. 2 is a sectional view taken along the lines 2—2 of FIG. 1.

The inventive rhomboidal to flat elliptic configuration of arms 34, 34', 35, 35' of tool holders 3,4 is clearly shown in FIG. 2. This configuration is essential for the invention since arms 34, 34', 35, 35' are thereby enabled to interengage during the operation and are given a highest degree of stability at the same time. Cutters 16,17 and 22, 23 are provided on the blunted ends 30 to 33 of the tool holders.

While a specific embodiment of the invention has been shown and described in detail to illustrate the application of the principles of the invention, it will be understood that the invention may be embodied otherwise without departing from such principles.

What is claimed is:

1. A device for cutting two parallel partially intersecting bores substantially simultaneously comprising:
   a device housing;
   a pair of parallel spindles rotatably mounted on said device housing, each spindle having a gear fixed thereto with said gears meshed with each other, so that rotation of one spindle in one direction causes rotation of the other spindle in an opposite direction;
   drive means connected to at least one of said spindles for rotating said one spindle in one direction, said drive means comprising a drive shaft connected to one of said spindles;
   a tool holder connected to each spindle which is elongated in a direction substantially transverse to an axis of its associated spindle and along a major tool axis to form a substantially symmetrical pair of radially extending arms which have a cross sectional shape in a plane extending transversely to the spindle axis which is rhomboidal to flat elliptical;
   said tool holders connected to said spindles so that each major tool holder axis is always substantially perpendicular to the other major tool holder axis as said spindles rotate;
   each tool holder having a central small diameter portion tapered in from an associated spindle so as to always maintain at least a minimum selected clearance with arms of the other tool holder; and
   a plurality of cutting tools connected to the arms of said tool holder for cutting the two parallel partially intersecting bores substantially simultaneously, at least one cutting tool positioned on each tool holder for cutting a bottom of the parallel bores at a radius to overlap a path of the arms of the other tool holder and at least one additional cutting tool positioned on each tool holder for cutting side walls of the paralle bores.

2. A device according to claim 1, wherein each radial arm of one tool holder has rounded opposite ends which come closest to the small diameter portion of the other tool holder.

3. A device according to claim 1, wherein each spindle includes a guide member extending beyond said tool holder associated with that spindle of a smaller diameter than a bore to be cut by the device adapted to enter a guide bore which is coaxial to one of the intersecting bores to be cut by the device, for guiding each spindle respectively.

4. A device according to claim 1, including a pair of bearings connecting each spindle on opposite sides of an associated gear thereof to said device housing.

* * * * *